United States Patent [19]

Feldtkeller

[11] Patent Number: 5,075,837
[45] Date of Patent: Dec. 24, 1991

[54] BLOCKING OSCILLATOR SWITCHING POWER SUPPLY WITH TRANSFORMER DEMAGNETIZATION MONITOR CIRCUIT

[75] Inventor: Martin Feldtkeller, Munich, Fed. Rep. of Germany

[73] Assignee: Siemens Aktiengesellschaft, Munich, Fed. Rep. of Germany

[21] Appl. No.: 591,136

[22] Filed: Oct. 1, 1990

[30] Foreign Application Priority Data

Sep. 29, 1989 [EP] European Pat. Off. ........ 89118087.9

[51] Int. Cl.⁵ .......................................... H02M 3/338
[52] U.S. Cl. ...................................... 363/19; 307/354; 363/56
[58] Field of Search ................ 363/18, 19, 56, 97; 307/354

[56] References Cited

U.S. PATENT DOCUMENTS 4,352,999 10/1982 Galpin ............................ 307/354
4,958,268 9/1990 Nagagata ......................... 363/19
4,984,145 1/1991 Dangschat et al. ............... 363/19

FOREIGN PATENT DOCUMENTS 88766 5/1986 Japan .

Primary Examiner—William H. Beha, Jr.
Attorney, Agent, or Firm—Herbert L. Lerner; Laurence A. Greenberg

[57] ABSTRACT

The transformer of a blocking oscillator converter is magnetized in a flux phase during which a switch on its primary side is switched on. In a blocking phase, in which the switch is switched off, the transformer is demagnetized by giving off energy to a load connected on the secondary side. In order to ensure for the switch to be switched on only after the transformer is fully demagnetized, a transformer voltage is formed and the switch is only allowed to switch on when the voltage of values with a polarity has returned to finite values with the opposite polarity. The threshold value begins at zero or a value of the first polarity after the switching power supply is put into operation and then shifts to values of a second polarity if the shift does not begin before the time at which the voltage at the load rises.

11 Claims, 2 Drawing Sheets

BLOCKING OSCILLATOR SWITCHING POWER SUPPLY WITH TRANSFORMER DEMAGNETIZATION MONITOR CIRCUIT

The invention relates to a circuit configuration for a blocking oscillator converter switching power supply, wherein the switching power supply includes a magnetizable transformer having a primary winding in the circuit of a direct voltage source being connected in series with an electric switch, and a secondary winding connected to a load; during operation of the switching power supply, the transformer being magnetized in a first phase (flux phase) in which the switch is switched on and demagnetized in a second phase (blocking phase) in which the switch is switched off; and the circuit configuration includes a demagnetization monitoring device picking up a voltage (feedback voltage) from a transformer winding and preventing the switched-off switch from being turned-on until the feedback voltage has dropped from values having a first polarity to a predetermined threshold value.

Blocking oscillator converters or flyback converters having such circuits are used in many ways in the field of entertainment electronics and industrial electronics, and various versions are known. Reference is made, for instance, to the textbook edited by Joachim Wüstehube, entitled "Schaltnetzteile" [Switching Power Supplies], published by Expert-Verlag in Grafenau, Federal Republic of Germany, 1979, and particularly chapter 3.3 thereof.

A blocking oscillator converter includes a transformer having a primary winding which is connected through an electric switch to a direct voltage, such as a rectified and smooth mains voltage, and a secondary circuit from which a likewise rectified, smoothed voltage is drawn. In a first phase or flux phase, the switch is conducting. Current then flows in the primary circuit, and the transformer receives electrical energy and stores it magnetically. In the second operating phase or blocking phase, the switch blocks the primary current flux, which leads to the polarity of the voltages at the transformer being changed. Current flows in the secondary circuit, and the transformer gives up the magnetically stored energy to the consumer or load.

A new operating cycle should not begin until the transformer is completely demagnetized, essentially for two reasons. If the flux phase is initiated before the transformer has given up all of its magnetic energy, then after several cycles it can be driven to saturation. In that state, the transformer then only has minimal inductance. A high primary current then flows and may possibly destroy the switch, which may be a SIPMOS transistor, for instance Another reason why absolutely complete demagnetization should also be sought is that if this is done, the information necessary for triggering the switching transistor can be obtained through the primary current, without using a sensor resistor in the emitter circuit of the switching transistor.

In order to monitor transformer demagnetization, the idea of measuring the voltage in the blocking phase in a suitable transformer winding, for instance the control winding firmly coupled to one of the secondary windings, is suggested. Once the transformer has given up all its stored energy the measurement voltage in fact changes its polarity. In that case, only the zero crossover needs to be detected, while taking care to ensure that the switching transistor is made conducting again only after being enabled by the zero crossover detector.

However, such a monitoring technique is not completely malfunction-free. Due to parasitic elements in the transformer, the measuring voltage oscillates with a lag at the beginning of the blocking phase. If there is a short circuit on the secondary side, "after-ringing" can cause changes in polarity before the transformer is completely demagnetized. In order to prevent the switching transistor from responding at the oscillation-dictated zero crossovers, the trigger logic is constructed in such a way that the information of the zero crossover detector is ignored for a certain period of time after the onset of the blocking phase. Although that kind of ringing fadeout is relatively simple to achieve, it does not detect all of the sources of error. In fact, a situation in which a sudden short circuit with inductive and capacitive components may arise on the output side, cannot be precluded. In such a short circuit, the output voltage breaks down to a low value, initially oscillating with a small amplitude about the zero point. If the short circuit then takes place only after the faded-out period of time, the zero crossovers occasioned thereby trigger premature starting pulses for the switching transistor. Although the consequences would be tolerable if the transformer were made with a relatively large reserve toward saturation, nevertheless such a component would be bulky and costly. It would also be conceivable to prevent the short-circuit oscillations in the output circuit by means of a diode connected antiparallel to the smoothing capacitor. However, inexpensive diodes cannot carry very high currents, so that such a solution is limited to switching power supplies or switch power packs of low capacity.

It is accordingly an object of the invention to provide a circuit configuration for a blocking oscillator converter switching power supply, which overcomes the hereinafore-mentioned disadvantages of the heretofore-known devices of this general type and which does so in such a way that demagnetization of the transformer can be monitored in a manner that is secure against error and without excessive expense for circuitry. The circuit should also be constructed in such a way that the switching power supply can have a compact form and is not limited to low output capacities.

With the foregoing and other objects in view there is provided, in accordance with the invention, a circuit configuration for a blocking oscillator converter switching power supply, comprising a switching power supply including an electric switch; a magnetizable transformer having a primary winding in a circuit of a direct voltage source being connected in series with the electric switch, and a secondary winding to be connected to a load; during operation of the switching power supply, the transformer being magnetized in a first phase in which the switch is switched on, and being demagnetized in a second phase in which the switch is switched off; the circuit configuration including a demagnetization monitoring device picking up a voltage from a transformer winding and preventing the turned-off switch from being turned on until the voltage has dropped from values having a first polarity to a predetermined threshold value; the demagnetization monitoring device including switching means giving the threshold value a time-dependent course, and the threshold value beginning initially at a value of zero or a value of the first polarity after the switching power supply is put into operation, and the threshold value then shifting to values of a second polarity on condition that the shift does not begin before the time at which the voltage dropping at the load begins to rise, at a rated load.

In accordance with another feature of the invention, the first phase is a flux phase, the second phase is a blocking phase, the voltage picked up from the transformer winding is a feedback voltage, and the voltage dropping at the load is a load voltage.

In accordance with a further feature of the invention, the shift of the threshold value is effected in proportion to the load voltage.

In accordance with an added feature of the invention, the shift of the threshold value does not begin until the load voltage has attained a rated value.

A circuit configuration according to the invention ignores all of the zero crossovers of the feedback voltage that occur in practice, which are not caused by the outflow of energy in the transformer. It achieves this not by introducing idle times for the zero crossover detector, for instance, but instead by shifting the switching threshold with respect to the zero value. The shift must be sufficiently great to ensure that the threshold value is not attained by ringing and short-circuit-dictated voltage fluctuations, but is exceeded by the negative voltage leaks following the demagnetization. These voltage peaks are dependent on the instantaneous output voltage of the switching power supply. The threshold value shift must therefore begin at zero (or at a very low value of the first polarity) upon startup of the power pack, and must be oriented to the format of the output voltage during the oscillation buildup process.

In accordance with an additional feature of the invention, the demagnetization monitoring device includes a zero crossover detector receiving a cumulative voltage formed from the feedback voltage and a time-dependent correction voltage, and the correction voltage has a course proportional to the threshold value, with the opposite algebraic sign.

The threshold value shift provided according to the invention can be achieved particularly simply in terms of circuitry by carrying the cumulative voltage to the zero crossover detector. As mentioned above, this voltage includes the feedback voltage that was already used previously, and a correction voltage, which has the same chronological course as the threshold value shift, but with the opposite algebraic sign (+ or −).

In accordance with yet an other feature of the invention, the transformer includes a further control winding, from which a control voltage being proportional to the load voltage is derived in addition to the feedback voltage, and the correction voltage is obtained from the control voltage.

In accordance with yet a further feature of the invention, there is provided a line carrying the control voltage, and an ohmic resistor connected between the line and an input of the zero crossover detector for obtaining the correction voltage from the control voltage.

For instance, the correction voltage could be a signal that is proportional to the output voltage. The superposition of the two signals can be accomplished by providing for the two signal lines to be connected to one another at a suitable point through the suitably dimensioned ohmic resistor. This alternative is recommended above all because it can be achieved with conventional trigger IC's. An additional component only needs to be inserted into the external wiring.

In accordance with yet an added feature of the invention, a ramp voltage is developed after the switching power supply is put into operation, and the correction voltage is obtained from the ram voltage.

In accordance with yet an additional feature of the invention, the correction voltage rises with a time lag relative to the ramp voltage whenever the ramp voltage is developed immediately after the switching power supply is put into operation.

Often the trigger component includes a startup circuit, in which a ramp voltage that is generated after the startup of the device gradually widens the trigger pulses of the switching transistor. In that case, drawing the correction voltage through the ramp voltage, optionally with a certain time lag, is suggested. This alternative has the advantage of ensuring that the correction voltage is independent of the voltage toward the output, so that an attempt at oscillation buildup in the presence of a short circuit on the output side is discontinued immediately.

In accordance with again another feature of the invention, there is provided a capacitor being charged by a reference voltage source and developing the ramp voltage after the switching power supply is put into operation, a transistor being wired as an emitter follower and having a base and an emitter, the base of the transistor receiving the voltage of the capacitor for obtaining the correction voltage, and a resistor connected between the emitter of the transistor and a signal input of the zero crossover detector.

In accordance with a concomitant feature of the invention, the blocking oscillator converter switching power supply is connected in a television set.

Other features which are considered as characteristic for the invention are set forth in the appended claims.

Although the invention is illustrated and described herein as embodied in a circuit configuration for a blocking oscillator converter switching power supply, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 ia a highly simplified schematic and block circuit diagram of a configuration of a first exemplary embodiment according to the invention;

Figure 1:
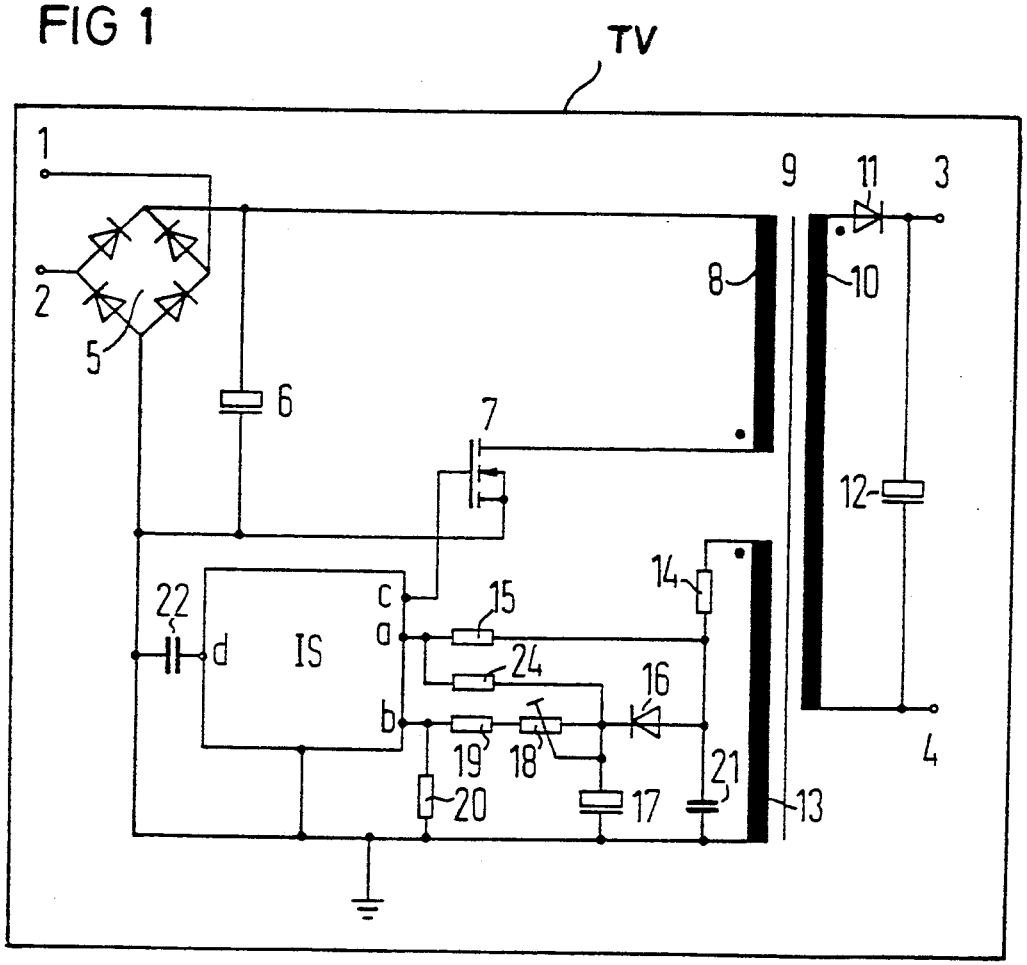

Referring now in detail to the figures of the drawing, in which elements corresponding to one another are provided with the same reference numerals, and first, particularly, to FIG. 1 thereof, there is seen a circuit of a free-oscillating blocking oscillator converter or flyback converter switching power supply or switch power pack, which generates a stabilized direct voltage at terminals 3 and 4 from a mains voltage applied between terminals 1 and 2. To this end, the mains voltage is first rectified in a rectifier 5, smoothed in a charge capacitor 6, and carried to a first primary winding or feed winding 8 of a transformer 9 through an electric switch, which in the present case is a SIPMOS transistor 7. During the conducting phase of the transistor 7, energy is magnetically stored in the transformer 9. In the blocking phase this energy is given up to a non-illustrated consumer or load connected between the terminals 3 and 4, through a secondary winding 10 of the transformer 9. The voltage dropping at the consumer is rectified and filtered through a diode 11 and a further charge capacitor 12.

In order to provide for pulse-width-modulated triggering of the transistor, the circuit includes a trigger component IS, which in the present example is the commercially available component TDA 4605.

The trigger component and its external wiring are described in detail in the Siemens Product Brochure entitled "IC's für die Unterhaltungselektronik" [IC's for Electronic Entertainment Systems], August 1987 edition, pp. 46–63, and in U.S. application Ser. No. 470,250 now U.S. Pat. No. 4,984,145. The circuit configuration is therefore only shown and described below to the extent necessary for a comprehension of the invention.

In order to turn on the transistor, the component IS receives a first voltage signal, which is a feedback voltage, at a pin a. This signal is supplied from a second winding or control winding 13, that is firmly coupled to the secondary winding, through resistors 14 and 15. In order to determine the pulse width, the component IS receives a control signal from the control winding at a connection or pin b. This signal is first rectified and smoothed through a diode 16 and a charge capacitor 17 and is subsequently divided downward in a voltage divider constructed of resistors 18, 19 and 20. In order to avoid a peak rectification of high-frequency components, the resistor 14 is expanded by a further capacitor 21 in order to make a low-pass filter. The width of the output pulse emitted at a pin c is adapted to the load of the secondary side by comparison of the control voltage with an internal reference voltage. In order to provide for a soft start of the switching power supply after it is put into operation, a further capacitor 22, which is connected to a pin d of the trigger component and generates a ramp voltage when the device is turned on, assures a gradual rise in the pulse duration. This prevents the switching frequency of the blocking oscillator converter power supply or power pack from entering the audible range in the turn-on phase.

Figure 2:
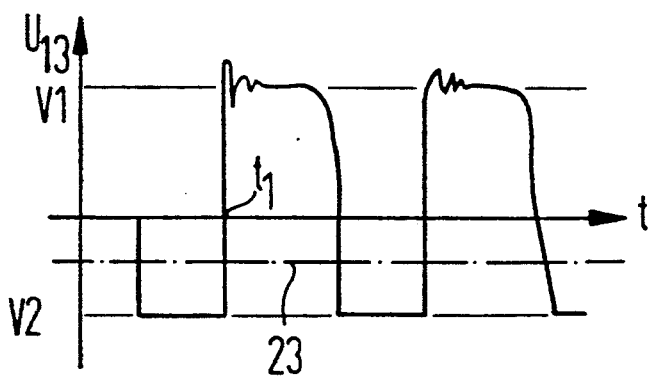
FIG. 2 is a graph of the chronological course of a voltage $U_{13}$ that is present at a control winding of a transformer of FIG. 1, during rated operation.
Figure 3:
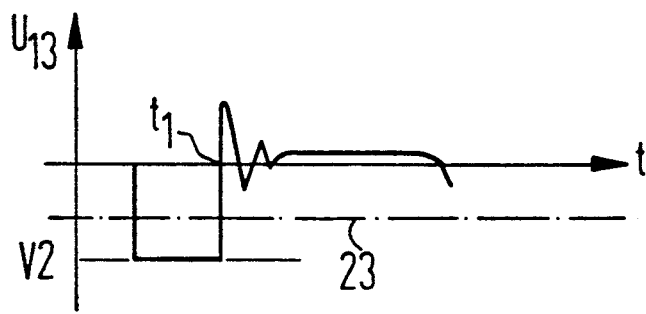
FIG. 3 is a graph of the voltage $U_{13}$, which is shown in the same manner as in FIG. 2, but in short-circuit operation.

During rated operation, the control winding voltage $U_{13}$ has the course shown in FIG. 2. At a time $t_1$, the blocking phase begins. In other words, the voltage which is negative in the flux phase, becomes positive and then, because of the unavoidable parasitic elements in the transformer, it continues to ring for some time, then stabilizes at a level V1 dependent on the output voltage, and finally drops below zero to a value V2 once all of the energy has flowed out of the transformer. If the output is short-circuited, then the voltage $U_{13}$ in the blocking phase only attains a relatively small positive value, and the result is that the voltage oscillations at the onset of the blocking phase can cause changes in algebraic sign, as shown in FIG. 3. Undesirable zero crossovers may then arise as seen in see FIG. 4, if a short circuit suddenly arises at the output side during operation of the switching power supply, and the short-circuited circuit has inductive and capacitive components.

Figure 4:
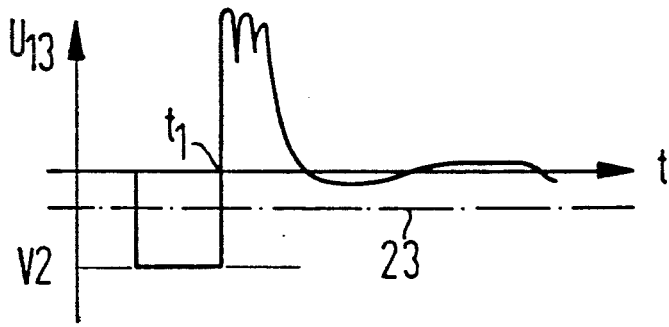
FIG. 4 is graph of the voltage, which is shown in the same manner as in FIG. 2, upon a sudden short circuit in an output circuit.

In order to then provide that only the zero crossovers that are occasioned by a complete demagnetization of the transformer will trip the turn-on of the transistor 7, the switching threshold is lowered to a value represented in FIGS. 2–4 by a straight dot-dash line 23. In terms of circuitry, this shift in switching threshold is achieved by providing that the line carrying the feedback signal is connected to the control voltage line through a resistor 24, at the site of the smoothing capacitor 17. Due to this provision, a correction voltage that is proportional to the control voltage or in other words to the output voltage is added to the feedback signal. The zero crossover detector in the trigger component accordingly receives a cumulative voltage, which then moves to zero, or in other words enables the turn-on pulse for the transistor 7, whenever the feedback voltage has dropped to a negative value that precisely compensates for the positive correction voltage.

Figure 5:
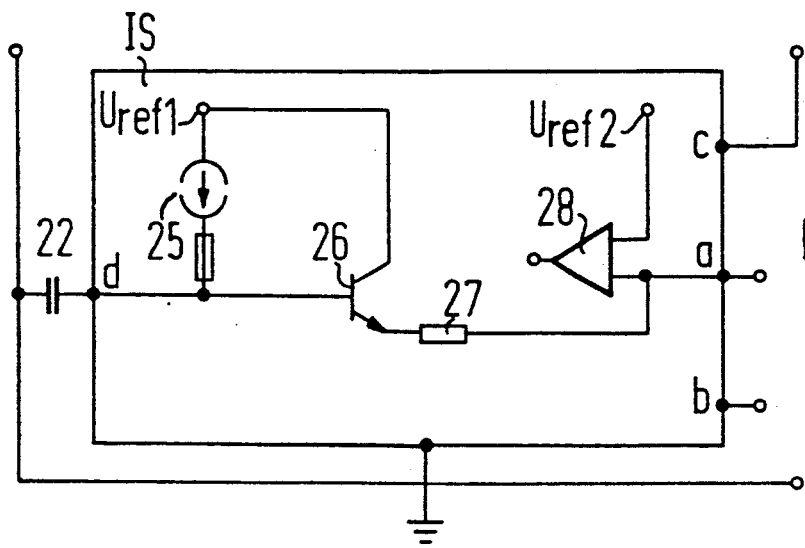
FIG. 5 is a highly simplified circuit diagram of a second exemplary embodiment of the invention.

FIG. 5 shows a way of generating the correction voltage independently of the load. As already noted, once the switching power supply is placed into operation, a ramp voltage is present at the capacitor 22, which has a format that is such that the capacitor is charged by a reference voltage source $U_{ref1}$ through a current source 25. If the ramp voltage is then carried to the base of a transistor 26 which is wired as an emitter follower and has its collector-to-emitter path connected to the source of a reference voltage $U_{ref1}$ as well as through a resistor 27 to the signal input of the zero crossover detector, which in the present case is constructed as a differential amplifier 28, then a correction voltage is superimposed on the feedback signal. After the switching power supply is placed into operation, this correction voltage is zero until such time a the gradually increasing ramp voltage present at the base makes the transistor conducting. The correction voltage then becomes positive, and upon saturation of the transistor it attains a constant value. The zero detector reacts whenever the cumulative voltage present at one of its inputs becomes more negative than a reference voltage $U_{ref2}$, which is about zero (+30 mV) and is fed to the other detector input. Since the correction voltage is independent of the load, the switching means must be constructed in such a way that the correction voltage does not become positive too early and does not assume overly positive values. Otherwise, the switching power supply would not begin to oscillate.

The invention is not limited merely to the exemplary embodiment that is shown. For instance, the switching power supply could also be constructed in such a way that it operates with a fixed frequency in rated operation. Moreover, the threshold value shift could be achieved in other ways than by imposition of a suitably corrected feedback signal on a zero crossover detector. For instance, it would be conceivable to modify the response threshold of the detector, instead of the input signal. It should also be emphasized again that the term "zero crossover detector" in the present context means detectors having response thresholds which are between zero and a very low value $U_{AS}$ of the first polarity, and it is typically true that $U_{AS} < 1/40\ U_{13}$.

I claim:

1. Circuit configuration for a blocking oscillator converter switching power supply, comprising:
   1) a switching power supply including
      a) an electric switch;

b) a magnetizable transformer having a primary winding in a circuit of a direct voltage source being connected in series with said electric switch, and a secondary winding to be connected to a load;

b) during operation of the switching power supply, said transformer being magnetized in a first phase in which said switch is switched on, and being demagnetized in a second phase in which said switch is switched off;

2) the circuit configuration including a) a demagnetization monitoring device picking up a voltage from a transformer winding and preventing said turned-off switch from being turned on until the voltage has dropped from values having a first polarity to a predetermined threshold value;

b) said demagnetization monitoring device including switching means giving the threshold value a time-dependent course, and c) the threshold value beginning initially at a value of zero or a value of the first polarity after the switching power supply is put into operation, and the threshold value then shifting to values of a second polarity if the shift does not begin before the time at which the voltage dropping at the load begins to rise, at a rated load.

2. Circuit configuration according to claim 1, wherein the the first phase is a flux phase, the second phase is a blocking phase, the voltage picked up from the transformer winding is a feedback voltage, and the voltage dropping at the load is a load voltage.

3. Circuit configuration according to claim 2, wherein the shift of the threshold value is effected in proportion to the load voltage.

4. Circuit configuration according to claim 2, wherein the shift of the threshold value does not begin until the load voltage has attained a rated value.

5. Circuit configuration according to claim 2, wherein said demagnetization monitoring device includes a zero crossover detector receiving a cumulative voltage formed from the feedback voltage and a time-dependent correction voltage, and the correction voltage has a course proportional to the threshold value, with the opposite algebraic sign.

6. Circuit configuration according to claim 5, wherein said transformer includes a further control winding, from which a control voltage being proportional to the load voltage is derived in addition to the feedback voltage, and the correction voltage is obtained from the control voltage.

7. Circuit configuration according to claim 6, including a line carrying the control voltage, and an ohmic resistor connected between the line and an input of said zero crossover detector for obtaining the correction voltage from the control voltage.

8. Circuit configuration according to claim 5, wherein a ramp voltage is developed after the switching power supply is put into operation, and the correction voltage is obtained from the ramp voltage.

9. Circuit configuration according to claim 8, wherein the correction voltage rises with a time lag relative to the ramp voltage whenever the ramp voltage is developed immediately after the switching power supply is put into operation.

10. Circuit configuration according to claim 9, including a capacitor being charged by a reference voltage source and developing the ramp voltage after the switching power supply is put into operation, a transistor being wired as an emitter follower and having a base and an emitter, the base of said transistor receiving the voltage of said capacitor for obtaining the correction voltage, and a resistor connected between the emitter of said transistor and a signal input of said zero crossover detector.

11. In a television set having a circuit configuration for a blocking oscillator converter switching power supply comprising:

1) a switching power supply including a) an electric switch;

b) a magnetizable transformer having a primary winding in a circuit of a direct voltage source being connected in series with said electric switch, and a secondary winding to be connected to a load;

b) during operation of the switching power supply, said transformer being magnetized in a first phase in which said switch is switched on, and being demagnetized in a second phase in which said switch is switched off;

2) the circuit configuration including a) a demagnetization monitoring device picking up a voltage from a transformer winding and preventing said turned-off switch from being turned on until the voltage has dropped from values having a first polarity to a predetermined threshold value;

b) said demagnetization monitoring device including switching means giving the threshold value a time-dependent course; and c) the threshold value beginning initially at a value of zero or a value of the first polarity after the switching power supply is put into operation, and the threshold value then shifting to values of a second polarity if the shift does not begin before the time at which the voltage dropping at the load begins to rise, at a rated load.

* * * * *

UNITED STATES PATENT AND TRADEMARK OFFICE
CERTIFICATE OF CORRECTION

PATENT NO. : 5,075,837
DATED : Dec. 24, 1991
INVENTOR(S) : MARTIN FELDTKELLER

It is certified that error appears in the above—identified patent and that said Letters Patent is hereby corrected as shown below:

Column 7, Claim 1, lines 25-26
"if the shift does not begin before"
should read -- not before -- ;

Column 8, Claim 11, lines 51-52
"if the shift does not begin before"
should read -- not before -- .

Signed and Sealed this

Twenty-third Day of March, 1993

Attest:

STEPHEN G. KUNIN

Attesting Officer

Acting Commissioner of Patents and Trademarks